United States Patent [19]

Sasada

[11] Patent Number: 5,682,972

[45] Date of Patent: Nov. 4, 1997

[54] TORSIONAL VIBRATION DAMPENING DEVICE

[75] Inventor: Eiichi Sasada, Nakano, Japan

[73] Assignee: Unisia Jecs Corporation, Atsugi, Japan

[21] Appl. No.: 660,374

[22] Filed: Jun. 7, 1996

[30] Foreign Application Priority Data

Jun. 9, 1995 [JP] Japan ................................. 7-142796

[51] Int. Cl.⁶ ........................... F16D 3/14; F16H 45/02
[52] U.S. Cl. ............................ 192/213; 192/3.29; 464/68
[58] Field of Search ........................... 192/3.28, 3.29, 192/205, 212, 213; 464/64, 67, 68

[56] References Cited

U.S. PATENT DOCUMENTS

| | | | |
|---|---|---|---|
| 4,305,487 | 12/1981 | Sunohara | 192/3.28 |
| 4,484,898 | 11/1984 | Kohno | 464/64 |
| 4,493,674 | 1/1985 | Tamura et al. | 464/68 |
| 4,530,673 | 7/1985 | Lamarche | 464/64 |
| 4,702,721 | 10/1987 | Lamarche | 464/67 |
| 4,944,712 | 7/1990 | Wörner et al. | 464/67 |
| 5,186,293 | 2/1993 | Fujimoto | 192/3.28 |

FOREIGN PATENT DOCUMENTS

| | | |
|---|---|---|
| 32 45 480 | 6/1983 | Germany . |
| 37 43 801 | 7/1989 | Germany . |
| 59-222624 | 12/1984 | Japan . |

*Primary Examiner*—Richard M. Lorence
*Attorney, Agent, or Firm*—Foley & Lardner

[57] ABSTRACT

A torsional vibration dampening device suitable for a clutch to transmit torque between driving and driven members, absorbing torsional vibrations, comprises a plurality of circumferentially extending spring receiving portions defined in both a torque-input member and a torque-output member, a plurality of damper spring sets operatively accommodated in the respective spring receiving portions, and a floating spring separator being rotatable relatively to both the torque-input member and the torque-output member and having a plurality of tapered arms interposed between adjacent damper springs in each spring set and a connecting member integrally formed with the tapered arms. The connecting member is cylindrical in shape and arcuately and rotatably accommodated in an essentially cylindrical aperture axially circumferentially extending along a cylindrical outer flanged portion of the device. The tapered arms project radially and inwardly from the cylindrical connecting member.

5 Claims, 3 Drawing Sheets

TORSIONAL VIBRATION DAMPENING DEVICE

BACKGROUND OF THE INVENTION

1. Field of the Invention

The present invention relates to a torsional vibration dampening device suitable for use in automotive clutches such as a clutch which is located in a power train between an internal combustion engine and a manually-shifted transmission, a lock-up clutch which is built in a so-called lock-up torque converter used in automatic transmissions, and the like, and specifically to a long-travel torsional vibration dampening device equipped with a plurality of torsion springs which prevent torsional vibration of the engine from being transmitted through the clutch, effectively absorbing torsional vibration.

2. Description of the Prior Art

As is generally known, a torsional vibration dampening device of a clutch is often comprised of a series of torsion springs, such as helical compression springs. In case of a clutch employed in manual transmissions, torsion springs are placed between a torque input member such as a drive washer, which is usually riveted to cushioning springs incorporated in the friction disk, and a torque output member such as a hub flange, which is usually attached to a friction-disk splined hub. In case of a lock-up clutch employed in automatic transmissions with a lock-up torque converter, torsion springs are interposed between a torque input member such as a drive plate, which is usually riveted to a substantially annular lock-up clutch piston, and a torque output member such as hub arms of a clutch hub which are firmly connected to a turbine hub by way of splined connection, meshed engagement, riveting or the like. With the previously-noted arrangement, the hub is driven through the torsion springs, and thus torsional vibrations are effectively absorbed. In order to enhance torsional-vibration absorbing performance and to effectively reduce undesired torsional vibrations between the torque-input and torque-output members, it is preferable to provide a longer amplitude (a longer travel) of torsion springs employed in the dampening device. For this purpose, a plurality of torsion springs are arranged in series to each other between the torque-input and torque-output members. One such torsional vibration dampening device has been disclosed in Japanese Patent Provisional Publication No. 59-222624. In the conventional dampening device disclosed in the Japanese Patent Provisional Publication No. 59-222624, a plurality of hollow spaces are defined by the torque-input and torque-output members, for receiving respective sets of torsion springs, each spring set consisting of two or more helical compression springs arranged in series to each other. The two adjacent spring sets are separated from each other by means of a floating spring separator or equalizer which is relatively and circumferentially rotatable with respect to both the torque-input and torque-output members. The floating spring separator comprises a plurality of substantially sectorial separating arms, each of which separates the opposing ends of two adjacent springs in each spring set, and a connecting member, which is integrally formed with the plural sectorial separating arms so that the sectorial separating arms are arranged in circumferentially and equi-distantly relationship with each other. When the torque-input member is rotated relatively to the torque-output member, the respective spring sets, on the one hand, act simultaneously as a compression spring because the spring sets are arranged to act in parallel with each other, and the springs included in each spring set, on the other hand, act serially as a compression spring, by way of synchronous rotation of each sectorial separating arm with the connecting member. The connecting member of the floating spring separator is shaped into an essentially annular flat plate, whereas the respective sectorial separating arms are integrally formed with the annular connecting member in such a manner as to radially and inwardly project with respect to the central axis of the clutch. In the previously-noted conventional dampening device, since the annular connecting member of the floating spring separator is an essentially annular flat plate, the outer peripheral section of the clutch, which is close to the outer periphery of the spring sets, tends to be greatly occupied by the annular connecting member. As a consequence, each spring set would be interposed substantially midway between the outermost peripheral portion of the dampening device and the central axis, and placed apart from the outer periphery of the dampening device. This results in a limited travel of the compression spring and consequently insufficient vibration absorbing performance. To avoid this and to ensure a long travel vibration dampening device, Japanese Patent Provisional Publication No. 62-228751 (corresponding to U.S. Pat. No. 4,702,721, issued Oct. 27, 1987 to Paul E. Lamarche, assigned to Borg-Warner Automotive, Inc.) teaches the provision of the dampening device with a plurality of torsion spring sets arranged in the vicinity of the outer periphery. In the U.S. Pat. No. 4,702,721, a torque-input member is comprised of a bent member including a pair of parallel arms joined by an inverted, U-shaped base forming a channel to receive a hub arm of a clutch-hub plate therein and firmly secured to the lock-up clutch piston. Actually, a plurality of torque-input bent members are circumferentially and equi-distantly spaced and secured to the clutch piston plate by means of riveting or the like. To properly separate torsion springs (damper springs) in a spring set, each floating spring separator is formed with a radially, outwardly projecting wedge-shaped arm portion, placed between the opposing ends of the two adjacent damper springs. Each spring separator is also formed with a pair of circumferentially, oppositely extending tab-like portions for partially receiving the outer peripheral portion of the opposing ends of a damper spring, while each of the torque-input member is formed with a pair of circumferentially extending arms for partially receiving the outer peripheral portion of the ends of two adjacent damper springs separated from each other by its U-shaped base. During straight-ahead driving, when the lock-up clutch is fully engaged at higher vehicle speeds above a predetermined level in the highest gear and thus the clutch piston plate is directly driven by the converter cover. At this time, the compression spring serving as a damper spring tends to be deformed radially and outwardly by means of centrifugal force, since the respective compression spring is received partially only at its both ends with respect to the radial and outward direction. In the event that there is a great magnitude of torsional vibration resulting from fluctuations in output torque produced by the engine, there is a possibility that the radial and outward deformation of each compression spring is excessively increased during relative rotation between the torque-input and torque-output members. This prevents a satisfactory compressive deformation of compression springs (a normal deformation obtained along the neutral axis of the compression spring initially set).

SUMMARY OF THE INVENTION

Accordingly, it is an object of the invention to provide an improved long-travel torsional vibration dampening device which avoids the foregoing disadvantages of the prior art.

It is another object of the invention to provide a long-travel torsional vibration dampening device for a clutch in which torsion springs (damper springs) are interposed between torque-input and torque-output members in close proximity to the outermost peripheral section of the clutch as much as possible, enabling a satisfactory compression of each torsion spring in the axial direction of the spring to consequently enhance torsional-vibration absorbing performance.

In order to accomplish the aforementioned and other objects of the invention, a torsional vibration dampening device to transmit torque between driving and driven members, absorbing torsional vibrations, comprises a plurality of circumferentially extending spring receiving portions defined in both a torque-input member and a torque-output member, a plurality of damper spring sets operatively accommodated in the respective spring receiving portions, so that the torque-input and torque-output members are coupled with each other resiliently in their rotational directions via the damper spring sets; each of the damper spring sets consisting of a plurality of compression springs serially arranged with each other, and a floating spring separator being rotatable relatively to both the torque-input member and the torque-output member and having a plurality of arms interposed between adjacent damper springs in a damper spring set and a connecting member adapted to integrally connect the plurality of arms to each other through the connecting member, wherein the connecting member is cylindrical in shape and arcuately and rotatably accommodated in an essentially cylindrical aperture axially circumferentially extending along a cylindrical outer flanged portion of the torsional vibration dampening device, and wherein the plurality of arms project radially and inwardly from the cylindrical connecting member.

According to another aspect of the invention, a torsional vibration dampening device for a clutch to transmit torque between driving and driven members, absorbing torsional vibrations, comprises a plurality of circumferentially extending spring receiving portions defined in both a torque-input member and a torque-output member, a plurality of damper spring sets operatively accommodated in the respective spring receiving portions, so that the torque-input and torque-output members are coupled with each other resiliently in their rotational directions via the damper spring sets; each of the damper spring sets consisting of a plurality of compression springs serially arranged with each other, a floating spring separator being rotatable relatively to both the torque-input member and the torque-output member and having a plurality of arms interposed between adjacent damper springs in a damper spring set and a connecting member adapted to integrally connect the plurality of arms to each other through the connecting member, and the torque-input member including a clutch piston plate adapted to engage the driving member and a plurality of circumferentially equi-distantly spaced spring-holder plates corresponding in number to the damper spring sets and secured to the clutch piston plate and axially aligned with the damper spring sets. The connecting member is cylindrical in shape and arcuately and rotatably accommodated in an essentially cylindrical axially circumferentially extending aperture defined between an outer peripheral surface of the spring-holder plates and an inner peripheral wall surface of a cylindrical outer ranged portion of the piston plate. The plurality of arms project radially and inwardly from the cylindrical connecting member. Each of the spring-receiving portions defined in the torque-input member comprises a spring-receiving hollow portion which includes a circumferentially-extending elongated arcuate slot, a pair of substantially U-shaped spring supports formed at both ends of the circumferentially-extending slot. The cylindrical connecting member is slidably guided on the substantially U-shaped spring supports. Each of the spring-receiving portions defined in the torque-output member comprises a spring-receiving abutment portion which comprises an axially bent arm axially bent from an annular base of the torque-output member secured to the driven member so that the axially bent arm is conformably received in an opening end of adjacent U-shaped spring supports. Each arm comprises a tapered arm extending radially inwardly from the cylindrical connecting member and interposed between two opposing spring ends of the damper springs within the spring-receiving hollow portion for permitting push from one of the two opposing spring ends to another via the tapered arm in a direction of neutral axes of the damper springs.

DESCRIPTION OF THE PREFERRED EMBODIMENTS

Figure 1:
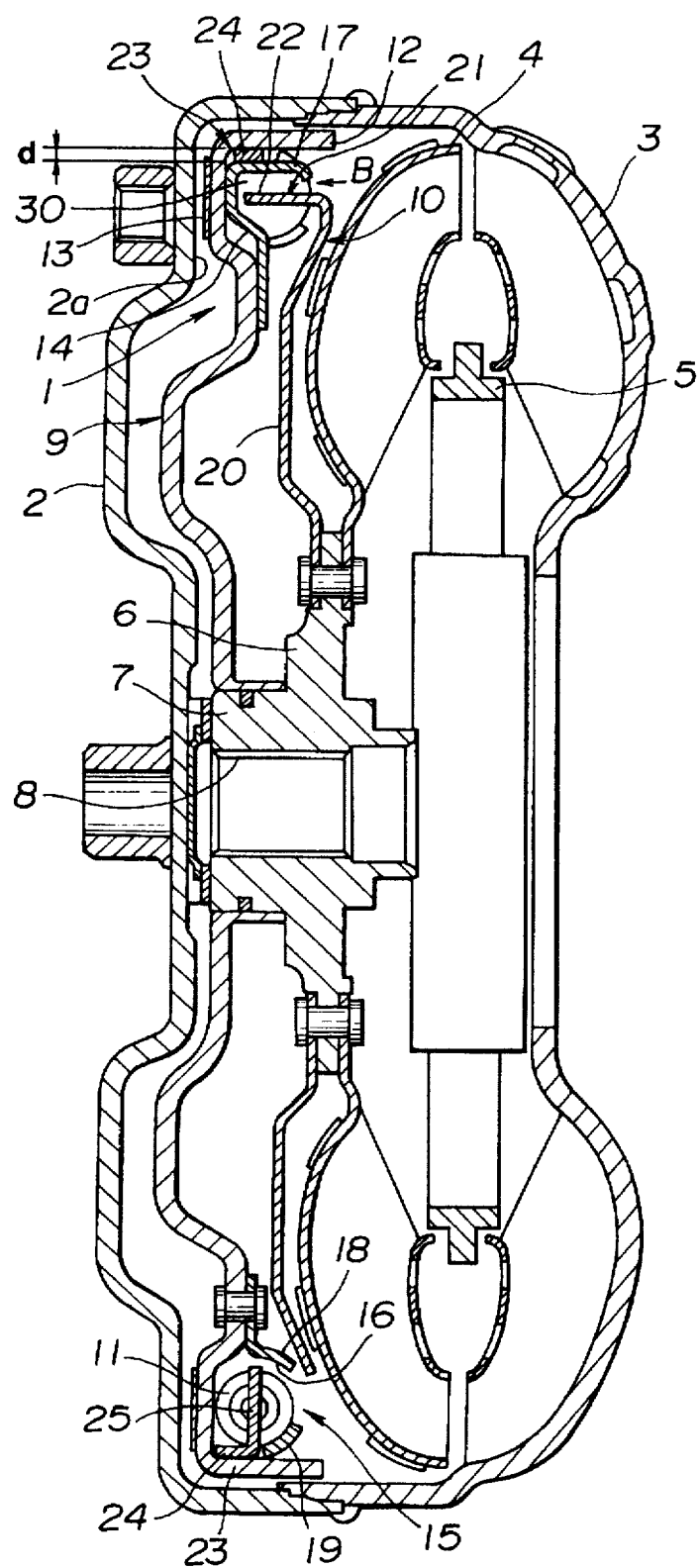
FIG. 1 is a cross-sectional view indicating one embodiment of a torsional vibration dampening device made according to the present invention, taken along the line A—A of FIG. 2.

Referring now to the drawings, particularly to FIG. 1, the torsional vibration dampening device of the invention is exemplified in case of a lock-up clutch 1 employed in a so-called lock-up torque converter. In FIG. 1, the lock-up torque converter includes a converter cover 2 having a driven connection with an engine crankshaft (not shown) to receive output torque produced by the engine, a pump impeller or a pump 3 integrally connected to the converter cover 2, a turbine or a turbine runner 4 disposed in the torque converter in a manner so as to oppose the pump impeller 3, a stator 5 interposed between the pump impeller and the turbine runner to form a torque converter. The turbine runner 4 is secured to a flanged portion 6 of a turbine hub 7 by way of riveting or the like. The turbine hub 7 is formed with a splined portion 8 on its inner periphery for splined connection to an automatic-transmission input shaft (not shown). A lock-up clutch 1 is provided between the inner wall of the converter cover 2 and the outer wall of the turbine runner 4 for the purpose of a direct connection between the converter cover and the turbine. The lock-up clutch 1 includes a lock-up clutch piston plate 9 which is engaged on the turbine hub 7 such that the innermost cylindrical flanged portion of the piston plate 9 is axially and slidably fitted onto the hub 7 in a fluid-tight fashion usually by way of an oil seal such as a O ring. The lock-up clutch 1 also includes a power-transmitting plate or a torque-transmitting plate 10 which is interposed between the piston plate 9 and the turbine runner 4 in such a manner as to face the right-hand wall surface (viewing FIG. 1) of the piston plate 9. The torque-transmitting plate 10 is secured at its inner perimeter to the flanged portion 6 of the turbine hub 7 together with the turbine runner 4 by means of riveting. Also provided are a plurality of compression springs, often called torsion springs or damper springs, for the purpose of resiliently or elastically connecting the piston plate 9 and the torque-transmitting plate 10. The piston plate 9 is substantially annular in shape and integrally formed with an essentially cylindrical outer ranged portion (the cylindrical outer flanged shell) 12 which extends axially backwardly from the outermost portion of the piston plate towards the outer periphery of the turbine runner 4. An annular friction ring 13 is secured onto the left-hand wall surface of the annular piston plate 9 such that the clutching surface of the annular friction ring 13 faces the inside wall 2a of the converter cover 2. The piston plate 9 is integrally connected at its right-hand wall surface to four-split spring-holder plates 14, equally spaced in the circumferential direction, by way of riveting or the like. Although it is not clearly shown, the piston plate 9 is axially slidable depending on the pressure difference between hydraulic pressures respectively acting the right and left wall surfaces, in a conventional manner. Assuming that the lock-up clutch 1 as indicated in FIG. 1 is actually mounted on an automatic transmission vehicle, the piston plate 9 is held in its dis-engaged position (see FIG. 1) at low vehicle speeds. When the vehicle speed rises and exceeds a predetermined level at the highest gear, the piston plate 9 moves forward (or leftward viewing FIG. 1), that is towards the clutch-engaged position owing to increase in the hydraulic pressure acting on the right-hand wall surface of the piston plate 9. In the clutch-engaged position, the piston plate 9 is firmly coupled with the converter cover 2 through the clutching surface of the annular friction ring 13. Typical details of the operation of a lock-up torque converter itself has been described, for example, in U.S. Pat. No. 4,305,487, issued Dec. 15, 1981 to Yoshio Sunohara, the teachings of which are hereby incorporated by reference. As may be appreciated, in the shown embodiment, the piston plate 9, the annular friction ring 13, and the spring-holder plates 14 are cooperative with each other to construct a torque-input member, whereas the torque-transmitting plate 10 constructs a torque-output member.

Figure 2:
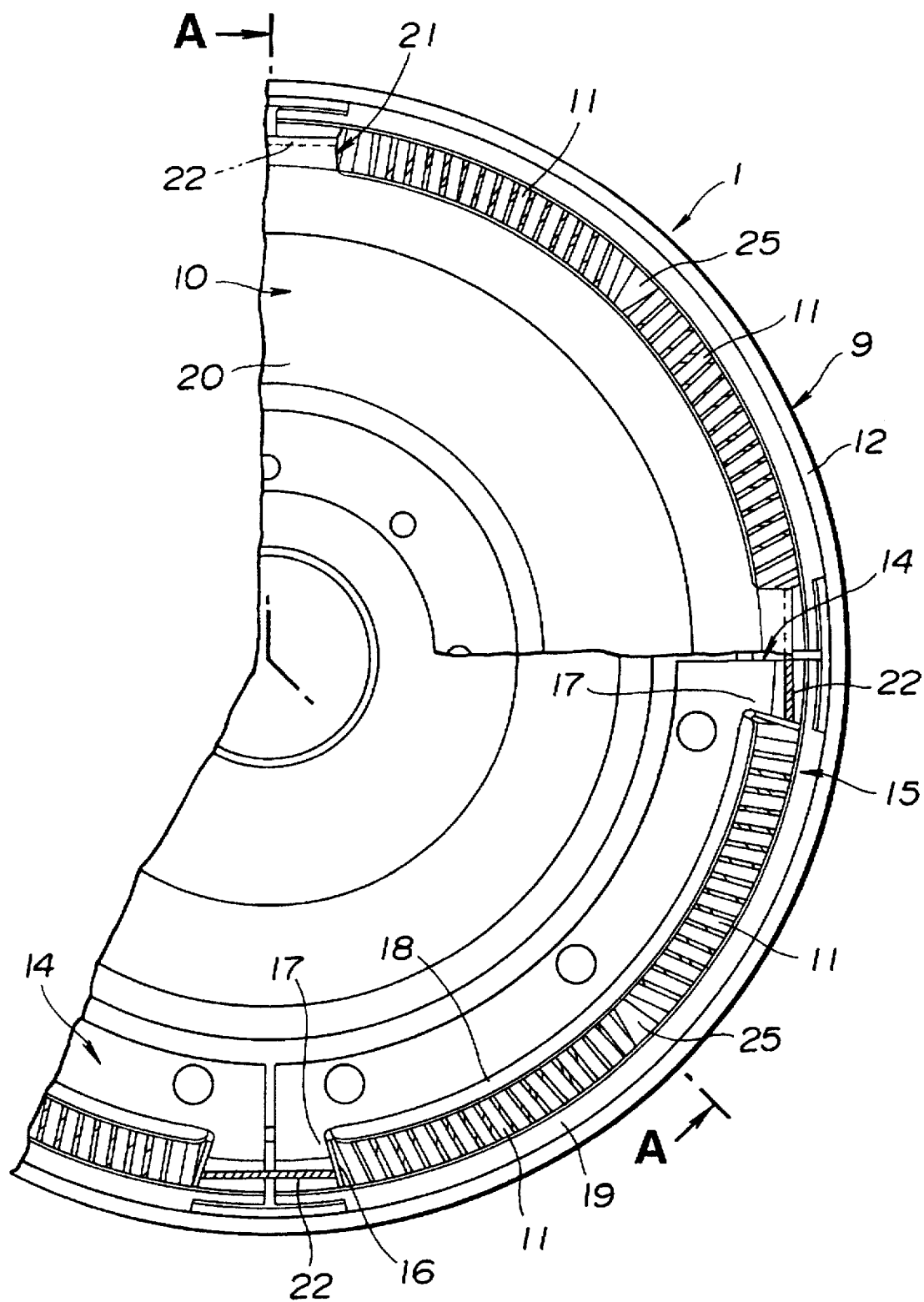
FIG. 2 is a partial rear elevational view taken in the direction indicated by the arrow B of FIG. 1, partly cut away.

Referring now to FIG. 2, each of the four-split spring-holder plates 14 is formed as one of quadrants which can be obtained by splitting a substantially annular plate into four. Each spring-holder plate 14 is formed with a spring-receiving hollow portion 15 at its outer peripheral edge. The spring-receiving hollow portions 15 correspond in number to the spring sets. The spring-receiving hollow portion 15 comprises a circumferentially-extending elongated arcuate opening or slot 16, a pair of spring supports 17, 17 formed at both ends of the circumferentially-extending slots 16, a circumferentially-extending inner spring-restriction plate 18 extending from the circumferentially-extending inner edge of the slot 16 and acting as a partial spring housing for the inside section of the compression spring set 11, 11 and having a curved wall surface of a slightly greater curvature than the helical compression spring 11, and a circumferentially-extending outer spring-restriction plate 19 extending from the circumferentially-extending outer edge of the slot 16 and acting as a partial spring housing for the outside section of the compression spring set 11, 11 and having a curved wall surface of a slightly greater curvature than the helical compression spring 11. In the shown embodiment, four sets of helical compression springs 11, 11 are operatively accommodated in the respective spring-receiving hollow portions 15, such that both ends of the compression springs 11 and 11 in each spring set abut with the two spring supports 17, 17, widely circumferentially spaced from each other, through a pair of spring retainers 30 (see FIG. 3). The inner spring-restriction plate 18 acts to restrict the radial and inward displacement of the compression spring 11 in cooperation with the right-hand wall of the piston plate 9 and also to restrict the backward displacement of the compression spring 11 towards the torque-converter turbine 4 in cooperation with the outer spring-restriction plate 19. On the other hand, the radial and outward displacement of the compression spring 11 can be restricted by the outer spring-restriction plate 19 and a connecting member 24 of a floating spring separator or equalizer 23 as will be more fully described later.

Referring again to FIG. 1, with the spring-holder plates 14 secured to the piston plate 9, each spring support 17 is formed into a substantially U-shape in such a manner as to have an opening end facing the outer periphery of the turbine runner 4.

Figure 3:
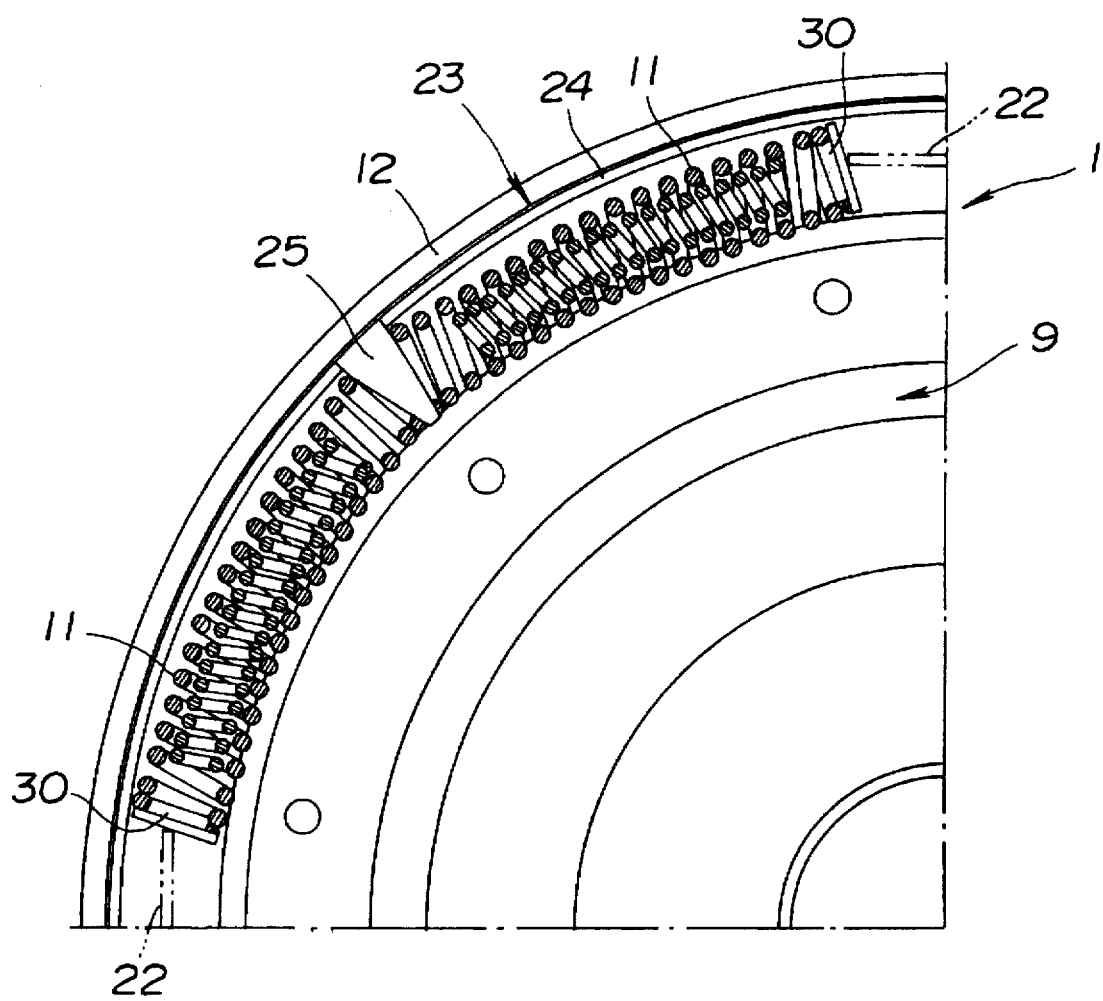
FIG. 3 is a partial rear elevational view illustrating one of quadrants of the torsional vibration dampening device, in the direction of the arrow B of FIG. 1. (A torque-transmitting plate and a spring holding member are both removed for the purpose of clearly indicating details of torsion springs.)

The torque-transmitting plate 10 is comprised of an essentially annular base body 20 secured to the flanged portion 6 of the turbine hub by rivets, and four spring-receiving abutment portions 21 circumferentially equidistantly spaced with each other and integrally formed with the outer periphery of the base body 20. The four spring-receiving abutment portions 21 are actually comprised of four axially bent arms 22 each of which is axially bent from the outer periphery of the annular base portion 20 in a manner so as to be conformably received in the opening ends of the corresponding two adjacent U-shaped spring supports 17, 17 (see FIG. 1). As clearly seen in FIG. 2, the bent arm 22 is axially radially aligned with the compression springs 11 such that both ends of the bent arm 22 are abuttable with the two spring retainers 30 fitted into the spring ends of the compression springs associated with the two adjacent spring supports 17, 17. To effectively absorb undesired torsional vibrations, as seen in FIG. 1, the compression springs 11, the spring supports 17 of the spring-holder plates 14, and the bent arms 22 of the spring-receiving abutment portions 21 are axially aligned with each other. As seen in FIGS. 2 and 3, the two compression springs 11, 11 in one spring set accommodated in the spring-receiving hollow portion 15 are separated from each other by means of the floating spring separator or equalizer 23 which is provided in such a manner as to be arcuately rotatable or movable relatively to both the torque-input and torque-output members. The spring separator 23 comprises four tapered radial arms 25 and the connecting member 24. Each tapered arm 25 is interposed between the two opposing spring ends of the compression springs in one spring set so that the two compression springs 11, 11 act serially each other through the tapered arm 25. The spring separator 23 is effective for equalization of loads resulting from torque fluctuations of the engine and applied to the compression springs 11, 11. As best seen in FIG. 3, the connecting member 24 is cylindrical in shape and arcuately rotatably accommodated or disposed in an essentially cylindrical narrow aperture defined between the outer peripheral surface of the spring-holder plates 14 and the inner peripheral wall surface of the cylindrical outer flanged portion 12 of the piston plate 9. As seen in FIG. 1, the cylindrical connecting member 24 is guided on the substantially U-shaped spring supports 17. The plural tapered arms 25 (four tapered arms in the embodiment) are integrally formed with the cylindrical connecting member 24 in circumferentially and equidistantly spaced relationship with each other, so that each of the tapered arms 25 is radially inwardly bent from the connecting member 24, and so that each tapered arm 25 tapers throughout its length from the greatest width at its bent root portion to the smallest width at its tip portion, and so that each tapered arm 25 is interposed between the two opposing spring ends within the spring-receiving hollow portion 15, thereby ensuring proper push from one of the two opposing spring ends of the associated compression springs 11, 11 to the other via the tapered arm 25 in the direction of their neutral axes, that is in the circumferential direction. The above-noted proper push permits both of the compression springs 11, 11 in the spring set to act serially to each other and thus results in a satisfactory compressive deformation of the compression springs during relative rotation between the torque-input member and the torque-output member, while preventing undesired outward deformation of each compression spring in an essentially radial direction perpendicular to the neutral axis of the compression spring. Additionally, since each tapered arm 25 projects radially and inwardly from the cylindrical connecting member 24, the smallest width of the tip end of the tapered arm 25 can be reduced as much as possible. This results in increase in the entire length of the damper spring 11. With the previously-noted arrangement, when the torque-input member is rotated relatively to the torque-output member, the four spring sets act simultaneously and parallel to each other, and also the compression springs in each spring set act serially to each other, by way of synchronous rotation of each spring-separator tapered arm 25 together with the cylindrical connecting member 24. The outer peripheries of the spring supports 17 of the spring-holder plates 14 are cooperated with the inner periphery of the cylindrical outer flanged portion 12 of the piston plate 9 so as to restrict the radial outward and radial inward movements of the cylindrical connecting member 24. The right-hand wall surface (facing the turbine runner 4) of the piston plate 9 and the circumferentially-extending outer spring-restriction plate 19 are cooperative with each other so as to restrict the axial movement of the connecting member 24.

With the previously-noted arrangement, the lock-up clutch 1 with the torsional vibration dampening device of the invention operates as follows.

When the lock-up clutch 1 is shifted to its clutch-engaged position (i.e., in a locked-up state) at the vehicle speed greater than the predetermined level at the highest gear, the annular friction ring 13 of the piston plate 9 is in full friction-contact with the inside wall 2a of the converter cover 2, with the result that the converter cover 2 is mechanically coupled with the turbine runner 4 and thus the engine crankshaft is directly coupled with the automatic-transmission input shaft (not shown) via the lock-up clutch 1. Torque transmitted from the converter cover 2 to the piston plate 9 of the lock-up clutch is further transmitted to the torque-transmitting plate 10 through the plural compression springs 11 and consequently to the turbine hub 7. In the event that there are torque fluctuations (i.e., undesired torsional vibrations), there is relative rotation of the torque-output member to the torque-input member. Owing to the relative rotation, the compression springs 11, 11 in each spring set act serially to each other via the spring-separator tapered arm 25 interposed between the compression springs both accommodated in the spring-receiving hollow portion 15. The serial connection of the compression springs in each spring set ensures a sufficient spring length which is obtained as the sum of the entire lengths of the compression springs in each spring set, and as a result undesired torsional-vibration components included in the transmitted torque can be effectively absorbed.

As will be appreciated from the above, since a plurality of floating spring-separator tapered arms 25 are coupled with each other by means of a connecting member 24 which is cylindrical in shape and arranged coaxially with respect to the axis of a clutch and disposed in a slight cylindrical aperture axially circumferentially extending along the cylindrical outer ranged shell of the clutch, the outer peripheral section of the clutch is not particularly occupied by the cylindrical connecting member. Therefore, each spring set can be provided in close proximity to the outermost peripheral section of the clutch as much as possible, and thus a compression spring of a sufficient spring length and spring diameter can be chosen. As a consequence, a torsional-vibration absorbing performance and a durability of a compression spring which is incorporated in a torsional-vibration dampening device, can be enhanced satisfactorily. In the shown embodiment, since the cylindrical connecting member 24 is disposed in a limited cylindrical aperture d which is narrow in the radial direction and wide in the axial direction, the connecting member can be more effectively and compactly assembled in the lock-up clutch assembly, as compared with the prior art device. In other words, since the cylindrical connecting member 24 is loosely fitted into the cylindrical aperture d between the outer peripheral surface of the spring-holder plates 14 and the inner peripheral wall surface of the cylindrical outer flanged portion 12 of the piston plate 9, such an arrangement prevents the connecting member 24 from ineffectively occupying the radial outside space of the compression springs 11 installed in the lock-up clutch assembly and permits the axial length (or the width) of the connecting member 24 to enlarge or increase. The increase in axial length of the connecting member 24 can enhance a mechanical strength and/or rigidity of the cylindrical connecting member 24 without occupying the radial outside space of the compression springs as much as possible.

In the previously-explained embodiment, the torsional vibration dampening device according to the present invention is applied to a lock-up clutch of an automatic transmission with a so-called lock-up torque converter, the torsional vibration dampening device may be applied to a clutch disc of a manual clutch. In the embodiment, although shown as single helical compression springs, each torsion spring may be a nested set of two or three concentric springs, and also the compression springs in one spring set have different spring characteristics depending on the desired damping action. Although one spring set is comprised of two compression springs, one spring set may be comprised of, for example, three compression springs. In this case, to properly separate the three compression springs in each spring set, the number of taped arms of a floating spring separator must be two. In the previously-discussed embodiment, although the spring separator consists of a plurality of tapered arms and a cylindrical connecting member integrally formed with the plural tapered arms, the tapered arms may be integrally connected to the connecting member by spot-welding or the like.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A torsional vibration dampening device to transmit torque between driving and driven members, absorbing torsional vibrations, comprising:

a plurality of circumferentially extending spring receiving portions (15, 21) defined in both a torque-input member (9, 13, 14) and a torque-output member (10);

a plurality of damper spring sets operatively accommodated in said respective spring receiving portions (15, 21), so that said torque-input and torque-output members are coupled with each other resiliently in their rotational directions via said damper spring sets; each of said damper spring sets consisting of a plurality of compression springs (11, 11) serially arranged with each other; and a floating spring separator (23) being rotatable relatively to both said torque-input member and said torque-output member and having a plurality of arms (25) interposed between adjacent damper springs (11, 11) in a damper spring set and a connecting member (24) adapted to integrally connect said plurality of arms (25) to each other through said connecting member, wherein said connecting member (24) is cylindrical in shape and arcuately and rotatably accommodated in an essentially cylindrical aperture (d) axially circumferentially extending along a cylindrical outer flanged portion of the torsional vibration dampening device, and wherein said plurality of arms (25) project radially and inwardly from said cylindrical connecting member (24).

2. A torsional vibration dampening device for a clutch to transmit torque between driving (2) and driven (4, 6, 7) members, absorbing torsional vibrations, comprising:

a plurality of circumferentially extending spring receiving portions (15, 21) defined in both a torque-input member (9, 13, 14) and a torque-output member (10);

a plurality of damper spring sets operatively accommodated in said respective spring receiving portions (15, 21), so that said torque-input and torque-output members are coupled with each other resiliently in their rotational directions via said damper spring sets; each of said damper spring sets consisting of a plurality of compression springs (11, 11) serially arranged with each other;

a floating spring separator (23) being rotatable relatively to both said torque-input member and said torque-output member and having a plurality of arms (25) interposed between adjacent damper springs (11, 11) in a damper spring set, and a connecting member (24) adapted to integrally connect said plurality of arms (25) to each other through said connecting member; and said torque-input member including a clutch piston plate (9) adapted to engage the driving member (2) and a plurality of circumferentially equi-distantly spaced spring-holder plates (14) corresponding in number to said damper spring sets and secured to said clutch piston plate (9) and axially aligned with said damper spring sets, wherein said connecting member (24) is cylindrical in shape and arcuately and rotatably accommodated in an essentially cylindrical axially circumferentially extending aperture (d) defined between an outer peripheral surface of said spring-holder plates (14) and an inner peripheral wall surface of a cylindrical outer flanged portion of said piston plate (9), and wherein said plurality of arms (25) project radially and inwardly from said cylindrical connecting member (24).

3. A torsional vibration dampening device as set forth in claim 2, wherein each of said spring-receiving portions (15) defined in said torque-input member comprises a spring-receiving hollow portion (15) which comprises a circumferentially-extending elongated arcuate slot (16), a pair of substantially U-shaped spring supports (17, 17) formed at both ends of said circumferentially-extending slot (16), a circumferentially-extending inner spring-restriction plate (18) extending from a circumferentially-extending inner edge of said slot (16) and acting as a partial spring housing for an inside section of damper springs (11, 11) in a damper spring set and having a curved wall surface of a slightly greater curvature than said damper spring, and a circumferentially-extending outer spring-restriction plate (19) extending from a circumferentially-extending outer edge of said slot (16) and acting as a partial spring housing for an outside section of said damper springs (11, 11) and having a curved wall surface of a slightly greater curvature than said damper spring, and wherein said cylindrical connecting member (24) is guided on said substantially U-shaped spring supports.

4. A torsional vibration dampening device as set forth in claim 2, wherein each of said spring-receiving portions (21) defined in said torque-output member comprises a spring-receiving abutment portion (21) which comprises an axially bent arm (22) axially bent from an annular base of said torque-output member secured to the driven member so that said axially bent arm (22) is conformably received in an opening end of adjacent U-shaped spring supports (17, 17).

5. A torsional vibration dampening device as set forth in claim 3, wherein each of said plurality of arms (25) comprises a tapered arm extending radially inwardly from said cylindrical connecting member (24) and interposed between two opposing spring ends of said damper springs (11, 11) within said spring-receiving hollow portion (15) for permitting push from one of said two opposing spring ends to another via said tapered arm in a direction of neutral axes of said damper springs.

* * * * *